United States Patent
Ogasawara (10) Patent No.: US 7,526,761 B2
(45) Date of Patent: Apr. 28, 2009

(54) EXCEPTION HANDLING COMPILER APPARATUS, PROGRAM, RECORDING MEDIUM, AND COMPILING METHOD

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 10/801,879

(22) Filed: Mar. 16, 2004

(65) Prior Publication Data
US 2004/0230962 A1 Nov. 18, 2004

(30) Foreign Application Priority Data
Mar. 20, 2003 (JP) ............................. 2003-079010

(51) Int. Cl.
*G06F 9/45* (2006.01)
(52) U.S. Cl. ...................................... 717/159
(58) Field of Classification Search ................. 717/158, 717/159
See application file for complete search history.

(56) References Cited

U.S. PATENT DOCUMENTS 6,113,651 A * 9/2000 Sakai et al. ................. 717/154

2003/0018961 A1 * 1/2003 Ogasawara ................. 717/158

OTHER PUBLICATIONS

Ogasawara et al. "A Study of Exception Handling and its Dynamic Optimization in Java," Object-Oriented Programming Systems, Languages and Applications (OOPSLA2001) proceeding 2001, Aug. 26, 2003.

* cited by examiner

*Primary Examiner*—John Chavis
(74) *Attorney, Agent, or Firm*—Scully, Scott, Murphy & Presser, P.C.; Lisa M. Yamonaco

(57) ABSTRACT

Compiler apparatus, methods and systems for optimizing exception handling in a program. An example apparatus comprises an exception handler detection section for detecting, from exception handlers that catch exceptions thrown in the program, a multiple-catching exception handler that catches a plurality of different exceptions and rethrow the caught exceptions; an exception selection section for selecting a set of exceptions that are to be shifted to common processing through rethrow of the exception by the multiple-catching exception handler from among the plurality of exceptions caught by the detected multiple-catching exception handler; and an exception handler throw section for throwing a clone exception handler that catches the set of exceptions selected by the exception selection section instead of the multiple-catching exception handler and shifting it to common processing.

3 Claims, 6 Drawing Sheets

```
1:try {
2:    try {
            ⋮
3:        L1= EXCEPTION 1
4:        throw L1
            ⋮
5:        L2= EXCEPTION 2
6:        throw L2
            ⋮
7:        L3= EXCEPTION 3
8:        throw L3
            ⋮
9:    } finally {
            ⋮
10:       L4= CAUGHT EXCEPTION
11:       throw L4
            ⋮
12:   }
13:} catch (EXCEPTION 1,  {         }
            EXCEPTION 2)
```

[Figure 4]

```
1: try {
2:     try {
              ⋮
3:         L1= EXCEPTION 1
4:         throw L1
              ⋮
5:         L2= EXCEPTION 2
6:         throw L2
              ⋮
7:         L3= EXCEPTION 3
8:         throw L3
              ⋮
9:     } catch (EXCEPTION 1, EXCEPTION 2)   {
              ⋮
10:        BRANCH INSTRUCTION FOR BRANCHING TO THE LINE 13
11:    } catch (EXCEPTION 3) {
              ⋮
12:    }
13: } catch (EXCEPTION 1, EXCEPTION 2)    {    }
```

EXCEPTION HANDLING COMPILER APPARATUS, PROGRAM, RECORDING MEDIUM, AND COMPILING METHOD

FIELD OF THE INVENTION

The invention relates to a compiler. More particularly, the invention relates to a compiler apparatus, compiler program, recording medium, and compiling method that optimize exception handling.

BACKGROUND ART

In recent years, programming languages that allow exception handling to be described has become widely used for the purpose of improving maintainability and robustness of programs. When an exception is thrown in a program written in such a programming language, the program shifts its processing from the point in the program where the exception has been thrown to an exception handler that handles the exception. For optimizing the shift of processing to an exception handler, a technology has been utilized that detects types of frequently thrown exceptions and rewrites the instruction that can throw the detected types of exception to a branch instruction leading to an exception handler. See the document, by Takeshi Ogasawara, Hideaki Komatsu, and Toshio Nakatani, "A study of Exception Handling and Its Dynamic Optimization in Java◊(registered trademark)", Object-Oriented Programming Systems, Languages, and Applications (OOPSLA2001) proceeding, 2001.

The technology described above, however, cannot optimize shift of processing to an exception handler if the types of exception that are to be thrown cannot be determined. For example, if an exception handler for catching multiple types of exception rethrows an exception it has caught, a compiler apparatus cannot determine how to optimize the instruction for rethrowing the exception since it cannot decide in advance which type of exception to catch.

SUMMARY OF THE INVENTION

Therefore, an aspect of the invention is to provide a compiler apparatus, compiler program, recording medium, and compiling method that can solve the above problem. The aspect is attained by combinations of features set forth in independent items. Dependent items define further advantageous and specific examples of the invention.

According to an example embodiment of the invention, a compiler apparatus for optimizing exception handling in a target program as a program to be compiled, comprises: an exception handler detection section for detecting, from among exception handlers that catch exceptions thrown in the target program, a multiple-catching exception handler that catches a plurality of different exceptions and rethrow the caught exceptions; an exception selection section for selecting a set of exceptions that is to be shifted to common processing through rethrow of the exceptions by the multiple-catching exception handler from among a plurality of exceptions caught by the detected multiple-catching exception handler; and an exception handler throw section for throwing a clone exception handler that catches the set of exceptions selected by the exception selection section instead of the multiple-catching exception handler and shifting it to common processing, a compiler program, a recording medium, and a compiling method are provided.

Although this summary of the invention above does not recite all the necessary features of the invention, but sub-combinations of these features may be the invention as well.

BRIEF DESCRIPTION OF THE DRAWINGS

For a more complete understanding of the present invention and the advantages thereof, reference is now made to the following description taken in conjunction with the accompanying drawings, in which:

FIG. 4 shows an example of the target program optimized by the compiler apparatus;

FIG. 5(*a*) shows another example of a target program to be compiled;

FIG. 5(*b*) shows types of exception that are thrown or caught by each instruction in the target program to be compiled as a function of depth of nesting of function call and exception catching ranges.

DESCRIPTION OF SYMBOLS

10 . . . compiler apparatus
100 . . . exception handler detection section
110 . . . exception selection section
120 . . . exception handler throw section
500 . . . function
510 . . . exception handler
520 . . . exception throwing instruction

DETAILED DESCRIPTION OF THE INVENTION

The present invention provides methods, systems and apparatus to optimize shift of processing to an exception handler when the types of exception that are to be thrown cannot be determined. If an exception handler for catching multiple types of exception rethrows an exception it has caught, a compiler apparatus determines how to optimize the instruction for rethrowing the exception.

In an example embodiment, the present invention provides a compiler apparatus for optimizing exception handling in a target program as a program to be compiled, comprising an exception handler detection section for detecting, from among exception handlers that catch exceptions thrown in the target program, a multiple-catching exception handler that catches a plurality of different exceptions and rethrow the caught exceptions; an exception selection section for selecting a set of exceptions that is to be shifted to common processing through rethrow of the exceptions by the multiple-catching exception handler from among a plurality of exceptions caught by the detected multiple-catching exception handler; and an exception handler throw section for throwing a clone exception handler that catches the set of exceptions selected by the exception selection section instead of the multiple-catching exception handler and shifting it to common processing, a compiler program, a recording medium, and a compiling method are provided.

The invention will more particularly be described by means of embodiments in the following description. Although the embodiments are not intended to limit the invention, and not all combinations of features set forth in the embodiments are essential for the solution provided by the present invention.

Figure 1:
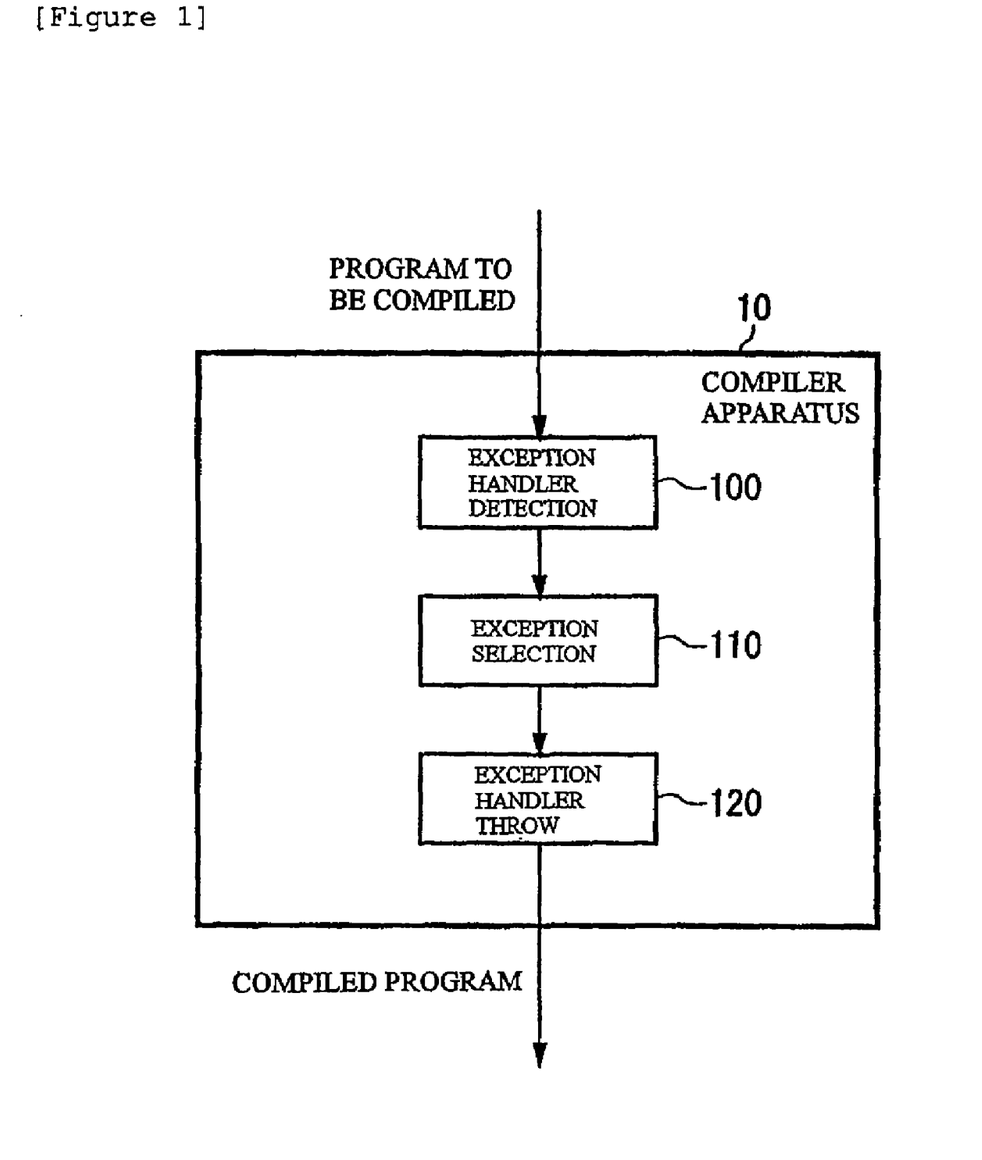
FIG. 1 is a functional block diagram of a compiler apparatus.

FIG. 1 shows a functional block diagram of a compiler apparatus 10. The compiler apparatus 10 is an apparatus that optimizes exception handling when a target program as a program to be compiled is compiled, comprising an exception handler detection section 100, an exception selection section 110, and an exception handler throw section 120. When the exception handler detection section 100 obtains a target program, it detects a multiple-catching exception handler from among exception handlers that catch exceptions thrown in the target program for catching a plurality of different exceptions and rethrowing the caught exceptions, and sends the detection result to the exception selection section 110.

Then, from among the plurality of exceptions caught by the multiple-catching exception handler that has been detected by the exception handler detection section 100, the exception selection section 110 selects a set of exceptions that should be shifted to common processing through rethrow of the exception by the multiple-catching exception handler and sends the result of the selection to the exception handler throw section 120. The exception handler throw section 120 then throws a clone exception handler that catches the set of exceptions selected by the exception selection section 110 instead of the multiple-catching exception handler and shifts it to common processing. Further, the exception handler throw section 120 throws a branch instruction for causing a shift to common processing in the thrown clone exception handler and causes a shift to common processing with the thrown branch instruction. Subsequently, the exception handler throw section 120 outputs the program for which the clone exception handler and the branch instruction were thrown as the result of compilation.

In this context, an exception is processing that occurs when processing that does not conform to a standard predefined for a programming language is performed in executing a target program, for example. Specifically, an exception occurs when an instruction in a target program attempts to access an array variable with a subscript that is out of the range defined for the array variable. Alternatively, an exception may be thrown with an instruction for autonomously throwing an exception whether rules predefined for the programming language are violated or not. As an example, an exception may be Exception in Java® (registered trademark) language.

A target program to be compiled is an intermediate representation thrown from a source program for efficient optimization and may be byte code in Java® (registered trademark) language, for example. Alternatively, a target program may be RTL (Register Transfer Language) or quadruple representation. A target program may also be an entire program to be executed by a user or a module representing a function in the target program. A module refers to a method, a function, or a procedure, for example.

Figure 2:
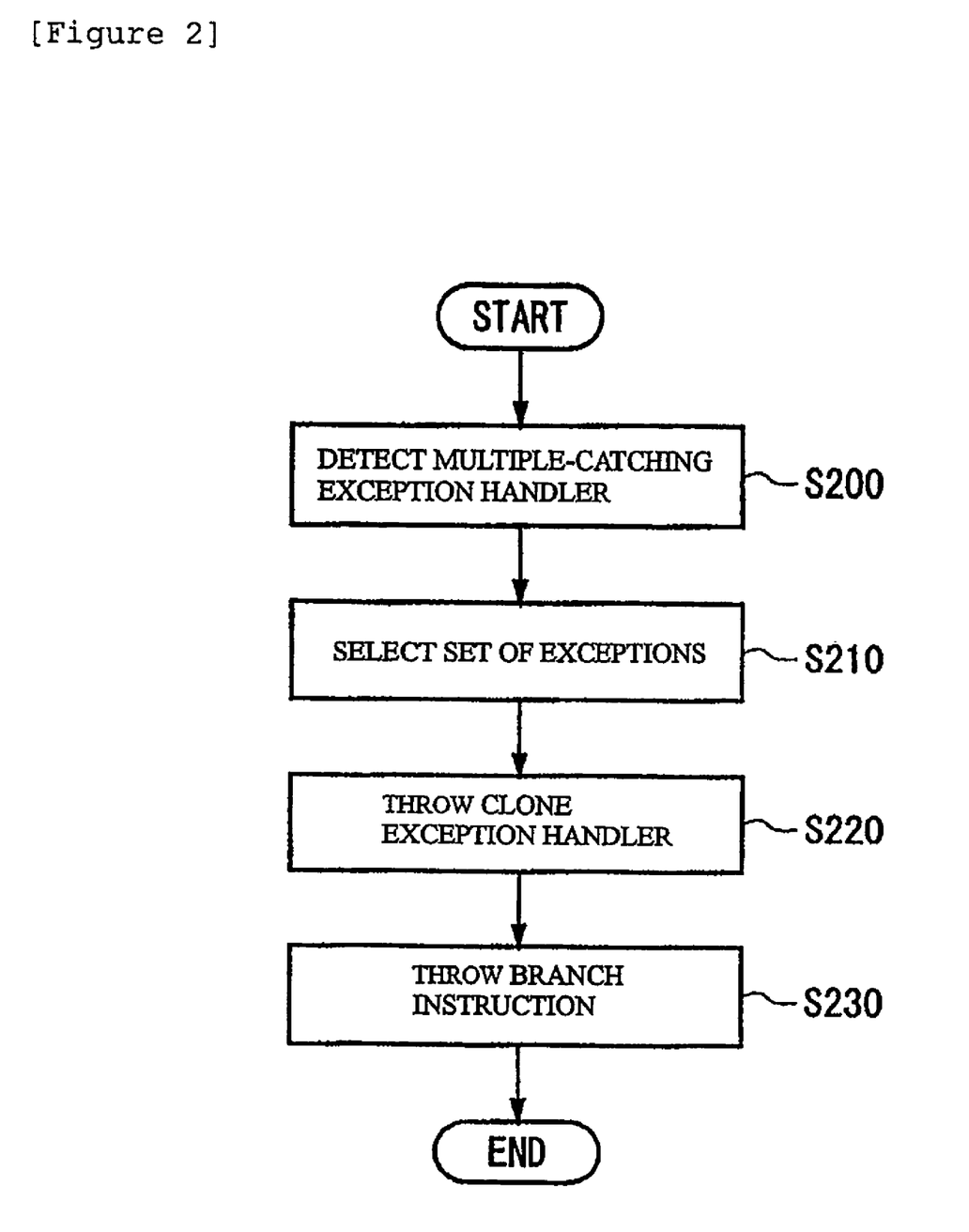
FIG. 2 is a flowchart for the compiler apparatus.

FIG. 2 shows a flowchart for the compiler apparatus 10. When the exception handler detection section 100 obtains a target program to be compiled, it detects, from among exception handlers for catching exceptions thrown in the target program, a multiple-catching exception handler that catches a plurality of different exceptions and rethrows the caught exceptions (S200).

Then, from among the plurality of exceptions caught by the multiple-catching exception handler that has been detected by the exception handler detection section 100, the exception selection section 110 selects a set of exceptions to be shifted to common processing through rethrow of the exceptions by the multiple-catching exception handler (S210). Preferably, the exception selection section 110 selects a set of exceptions further on condition that the frequency with which they are thrown in the multiple-catching exception handler is above a predetermined reference frequency. For example, as the frequency with which exceptions are thrown in the multiple-catching exception handler, the exception selection section 110 may detect the number of times that any of the set of exceptions is thrown in the multiple-catching exception handler per the number of execution of the multiple-catching exception handler, and detect the sets of exceptions based on the detected number.

As a way of detecting the frequency of exception throw, the compiler apparatus 10 may detect it based on information for when a target program that has been compiled once in another way is actually executed, or may compute an estimated value of the frequency based on information about the control flow and data flow of the target program.

The exception handler throw section 120 then throws a clone exception handler for catching the set of exception selected by the exception selection section 110 instead of the multiple-catching exception handler for shifting it to common processing (S220). Then, the exception handler throw section 120 throws a branch instruction for causing a shift to common processing in the thrown clone exception handler and causes a shift to common processing through the thrown branch instruction (S230). The exception handler throw section 120 also copies processing approximately the same as processing executed in the multiple-catching exception handler to the clone exception handler so that execution result of the target program is maintained.

In this manner, the compiler apparatus 10 throws a clone exception handler for catching exceptions instead of a multiple-catching exception handler and shifting them to common processing, and throws a branch instruction for causing a shift to common processing in the clone exception handler. This allows the compiler apparatus 10 to omit the rethrow of caught exceptions and to shift processing to common processing through a mere branch instruction.

The timing with which the series of processing shown in the figure is not limited to before the execution of the target program to be compiled is started. For example, the compiler apparatus 10 may throw the clone exception handler during the execution of the target program that has been compiled once. More specifically, the exception selection section 110 selects a set of exceptions whose frequency of throw in a multiple-catching exception handler is above a predefined reference frequency during the execution of the target program. And, from among the selected sets of exceptions, the exception selection section 110 selects a set of exception to be shifted to common processing through rethrow of the exceptions by the multiple-catching exception handler. This allows the exception handler throw section 120 to throw a clone exception handler as necessary during the execution of the target program. In other words, the compiler apparatus 10 includes the function of optimizing a target program to be compiled before starting to execute the program as well as the function of optimizing the target program as appropriate during the execution of the program, e.g. a function realized as a runtime library.

Figure 3:
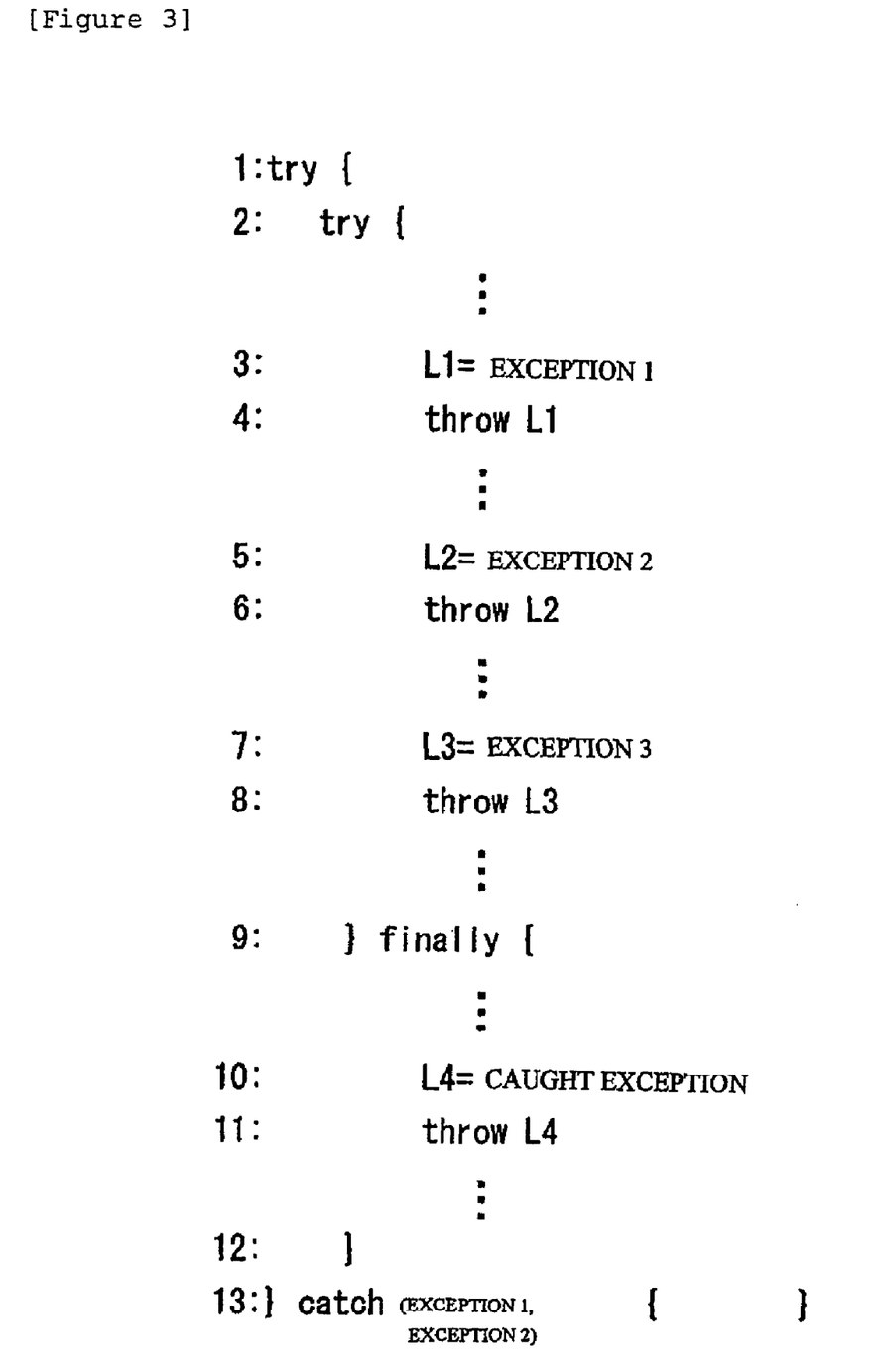
FIG. 3 shows an example of a target program to be compiled.

FIG. 3 shows an example of target program to be compiled. The braces shown in the first and thirteenth lines designate the exception catching range for catching exceptions with the exception handler shown in the thirteenth line. The braces shown in the second and ninth lines designate the exception catching range for the exception handler shown from the ninth to twelfth lines. In other words, in the target program depicted, exceptions thrown in the exception catching range between the second and ninth lines are caught by the exception handler shown from the ninth to twelfth lines. Further, exceptions thrown in the exception handler shown between the ninth and twelfth lines are caught by the exception handler in the thirteenth line. The exception handler in the thirteenth line, however, catches the exceptions 1 and 2 among exceptions thrown in the exception handler shown from the ninth to twelfth lines.

The instruction in the third and fourth lines is an instruction for throwing the exception 1. The instruction in the fifth and sixth lines is an instruction for throwing the exception 2. The instruction in the seventh and eighth lines is an instruction for throwing the exception 3. The instruction in the tenth and eleventh lines is an instruction that rethrows exceptions caught by the exception handler shown from the ninth to twelfth lines. As shown, instructions that autonomously throw exceptions specify types of exception. For example, the instruction in the third and fourth lines throws exceptions of the type "exception 1". And the exception handlers initiate processing when an exception that corresponds to the type of exception they specified has been thrown. For example, the exception handler in the thirteenth line catches the exception 1 and exception 2 which correspond to the exceptions it specifies among those thrown in its exception detection range and initiates the processing in the thirteenth line.

Upon obtaining the target program in the figure, the exception handler detection section 100 detects the exception handler shown from the ninth to twelfth lines as a multiple-catching exception handler. Then, from a plurality of exceptions caught by the multiple-catching exception handler, i.e. the exceptions 1, 2, and 3, the exception selection section 110 selects a set of exceptions which is to be shifted to common processing by the multiple-catching exception handler rethrowing the exceptions. For instance, whether the multiple-catching exception handler throws either of the exception 1 or 2, its processing will be shifted to common processing shown in the thirteenth line, so the exception selection section 110 selects the exceptions 1 and 2 as a set of exceptions to be shifted to common processing.

In the example in the figure, the multiple-catching exception handler is finally clause in Java⁰ (registered trademark) language and the like for catching any exception thrown in an exception detection range. Alternatively, the multiple-catching exception handler may be catch clause that catches multiple exceptions in Java⁰ (registered trademark) language and the like. For example, in Java⁰ (registered trademark) language, types of exception are represented by objects that identify types of exception. Catch clause catches all objects that are of child class of objects for specified exceptions. That is, the multiple-catching exception handler may be catch clause that catches exceptions expressed as objects that are of parent class of multiple objects.

That an exception handler catches an exception means that processing of the exception handler is initiated on condition that the exception is thrown. In particular, that the exception handler from the ninth to twelfth lines catches the exception 1 means that the processing of the exception handler from the ninth to twelfth lines is started provided that the exception 1 is thrown.

FIG. 4 shows an example of the target program that has been optimized by the compiler apparatus 10. The exception handler throw section 120 throws a clone exception handler, e.g. the instruction in the ninth and tenth lines, for catching the exceptions 1 and 2 that are the set selected by the exception selection section 110 and shifting them to common processing. The exception handler throw section 120 then throws an exception handler in the eleventh and twelfth lines that catches only the exception 3 instead of the multiple-catching exception handler shown from the ninth to twelfth lines in FIG. 3 so that the exceptions 1 and 2 which are exceptions of the set selected by the exception selection section 110 are caught in the clone exception handler. Then, the exception handler throw section 120 throws a branch instruction in the tenth line for causing a shift to common processing in the clone exception handler and causes a shift to common processing with the thrown branch instruction.

Thus, the compiler apparatus 10 selects a set of exceptions that are to be shifted to common processing through rethrow of the exceptions by the multiple-catching exception handler, and throws a clone exception handler for catching the selected set of exceptions instead of the multiple-catching exception handler and shifting it to common processing. In addition, the compiler apparatus 10 throws a branch instruction for causing a shift to common processing in the clone exception handler. This allows the compiler apparatus 10 to omit processing that is required upon throw of an exception and to shift processing with a mere branch instruction.

Figure 5:
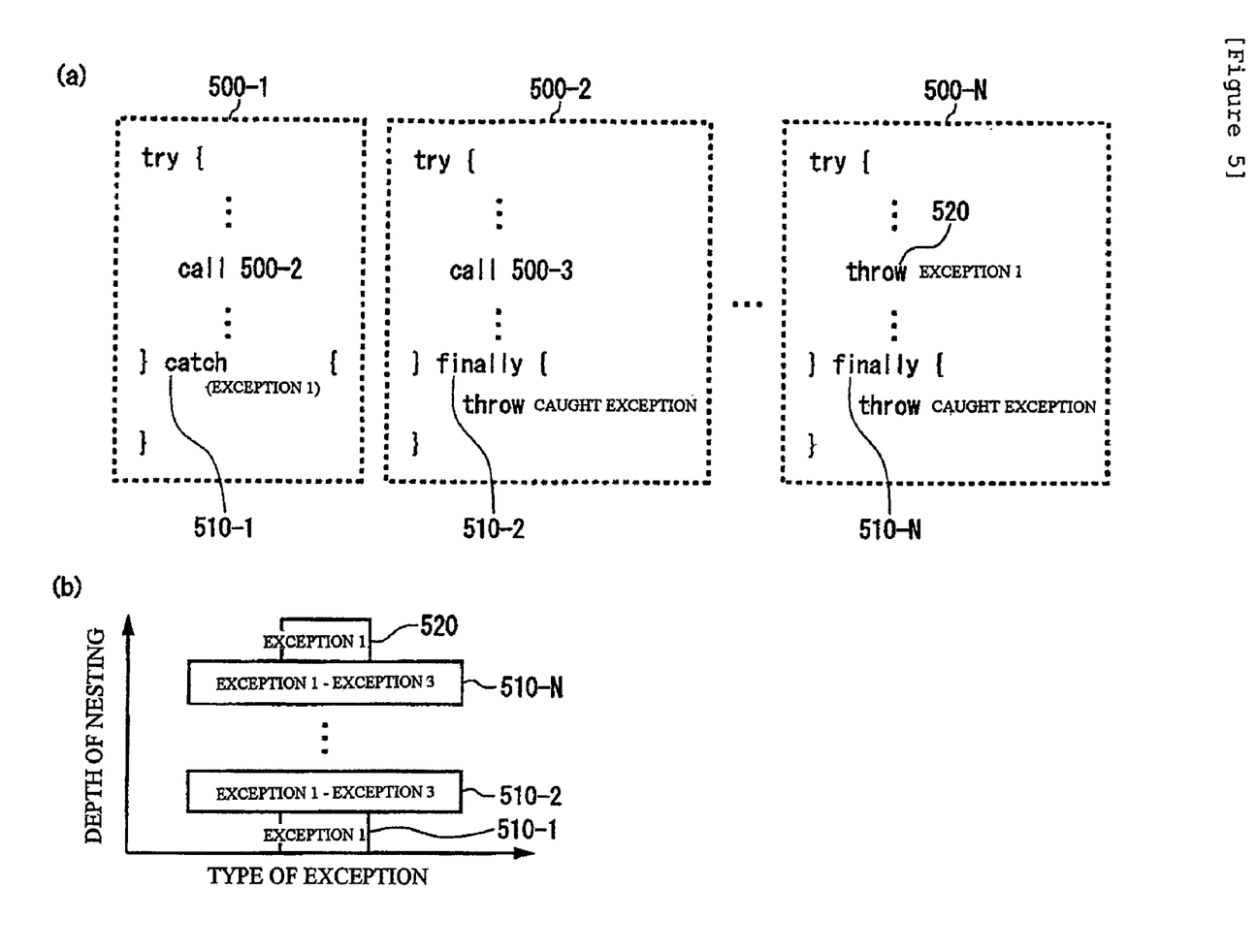

FIG. 5(a) shows another example of the target program to be compiled. The compiler apparatus 10 obtains functions 500-1 to N as the target program. The function 500-1 includes an exception handler 510-1 and a call instruction for calling the function 500-2 within the exception detection range for the exception handler 510-1. The function 500-2 includes an exception handler 510-2 and a call instruction for calling the function 500-3 within the exception detection range for the exception handler 510-2. The functions 500-3 to N-1 are similar to the function 500-1 and initiate execution upon being called sequentially in this order. The function 500-N initiates its execution upon being called by the function 500-(N-1) and includes the exception handler 510-N and an exception throwing instruction 520 for throwing an exception in the exception detection range of the exception handler 510-N. A function refers to a portion of a target program that is predefined by the creator of the target program and may be a method or a procedure.

When it obtains the target program, the exception handler detection section 100 detects two multiple-catching exception handlers, i.e. the exception handler 510-N that is one multiple-catching exception handler and the exception handler 510-2 that is another multiple-catching exception handler for catching at least one exception thrown in the exception handler 510-N. The exception selection section 110 then selects a set of exceptions from a plurality of exceptions caught by the exception handler 510-N that is to be shifted to processing in the exception handler 510-2 through rethrow of the exceptions by the exception handler 510-N and that is then shifted to common processing by rethrowing the exceptions caught in the exception handler 510-2. For example, when the exception 1 is thrown in the example in the figure, it will be caught by the exception handler 510-2 and its processing will be shifted from the exception handler 510-2 to the exception handler 510-1, so the exception selection section 110 selects the exception 1.

In response to that, the exception handler throw section 120 throws each of two clone exception handlers that correspond to each of the two multiple-catching exception handlers, and causes each of the two corresponding clone exception handlers to catch the exception 1 selected by the exception selection section 110 instead of each of the two multiple-catching exception handlers.

FIG. 5(b) shows types of exception that are thrown or caught by each instruction in the target program to be compiled as a function of depth of nesting of function call and exception catching range. For example, exception instruction 520 is an instruction for throwing the exception 1, and each of the exception handlers 510-2 and 510-N is an instruction for catching the exceptions 1, 2, and 3. The exception handler 510-1 is an instruction for catching the exception 1.

The exception handler 510-1 catches outside a function call the exception 1 thrown while processing the function 500-2 that has been called by a function call. The exception handler 510-2 catches exceptions thrown inside functions called by functions including the exception handler 510-1. That is, the exception handler 510-2 catches exceptions thrown between the function 500-2 and the function 500-N. The exception handler 510-N catches exceptions thrown by the exception throwing instruction 520.

This means that nesting of function call for the exception handler 510-2 is deeper than that for the exception handler 510-1. As well, nesting of the exception detection range for the exception handler 510-2 is deeper than that for the exception handler 510-1. Similarly, the exception handlers 510-3 to 510-N have deeper and deeper nesting of function call and exception detection range in this order.

Thus, the exception handler 510-N as an example of the multiple-catching exception handler goes through other exception handlers in shifting processing to the exception handler 510-1, which is an example of common processing. Therefore, the more number of other exception handlers processing goes through when it shifts from the exception handler 510-N to the exception handler 510-1, the more time it takes from throw of an exception to a shift to common processing.

Similarly, the exception handler 510-N goes through the process of recovering from function calls of the functions 500-N to 500-2 when shifting processing to the exception handler 510-1. Thus, the deeper the depth of nesting of function call from the exception handler 510-1 down to the exception handler 510-N is, the more time it takes from throw of an exception to transition to the common processing.

In order to reduce time required for the processing above, the exception selection section 110 preferably selects a set of exceptions further on condition that the number of other exception handlers which processing goes through during its shift from the exception handler 510-N to the exception handler 510-1 is more than a predetermined number and that the depth of nesting of function calls from the exception handler 510-1 down to the exception handler 510-N is more than a predetermined number.

That is, from a plurality of exceptions caught by the exception handler 510-N, the exception selection section 110 selects a combination of exceptions to be shifted to the exception handler 510-1 through rethrow of the exceptions by the exception handler 510-N, for which the number of other exception handlers through which processing shifts from the exception handler 510-N to the exception handler 510-1 is more than a predetermined number and the depth of nesting of function calls from the exception handler 510-1 down to the exception handler 510-N is more than a predetermined number.

The same applies to a case where more than two multiple-catching exception handler are detected. For example, the exception selection section 110 selects a set of exceptions further on condition that the number of other exception handlers through which processing shifts from a first multiple-catching exception handler via a second multiple-catching exception handler to a third multiple-catching exception handler is more than a predetermined number and that the depth of nesting of function calls from the first multiple-catching exception handler via the second multiple-catching exception handler down to the third multiple-catching exception handler is more than a predetermined number.

Figure 6:
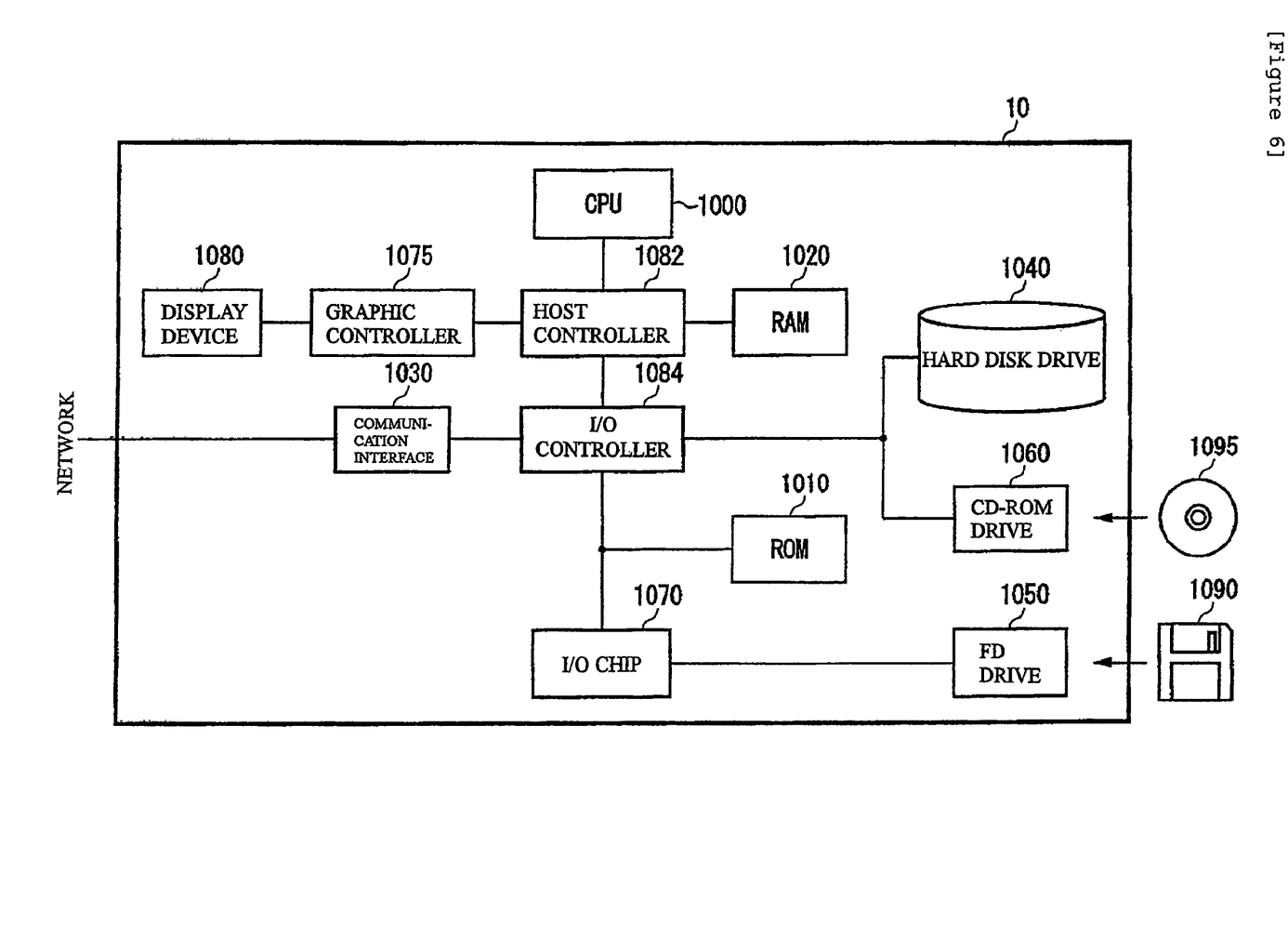
FIG. 6 shows an example of the hardware configuration of the compiler apparatus.

FIG. 6 shows an example of the hardware configuration of the compiler apparatus 10. The compiler apparatus 10 according to the embodiment comprises a CPU peripheral portion having CPU 1000, RAM 1020, a graphic controller 1075, and a display device 1080 that are interconnected by a host controller 1082; an input/output portion having a communication interface 1030, hard disk drive 1040, and CD-ROM drive 1060 that are connected to the host controller 1082 by an input/output controller 1084; and a legacy input/output portion having ROM 1010, a flexible disk drive 1050, and an input/output chip 1070 that are connected to the input/output controller 1084.

The host controller 1082 connects the RAM 1020 with the CPU 1000 and graphic controller 1075 that access the RAM 1020 at a high transfer rate. The CPU 1000 operates based on a compiler program stored in the ROM 1010 and RAM 1020, controlling each portion. The graphic controller 1075 obtains image data that is thrown by the CPU 1000 and the like in a frame buffer provided in the RAM 1020 and displays it on the display device 1080. Alternatively, the graphic controller 1075 may internally contain a frame buffer for storing image data thrown by the CPU 1000 and the like.

The input/output controller 1084 connects the host controller 1082 with the communication interface 1030, the hard disk drive 1040, and the CD-ROM drive 1060 that are relatively high-speed input/output devices. The communication interface 1030 communicates with other devices through a network. The hard disk drive 1040 stores a compiler program and data to be used by the compiler apparatus 10. The CD-ROM drive 1060 reads the compiler program and data from the CD-ROM 1095 and provides it to the input/output chip 1070 via the RAM 1020.

To the input/output controller 1084, the ROM 1010 and relatively low-speed input/output devices such as the flexible disk drive 1050 and input/output chip 1070 are connected. The ROM 1010 stores a boot program to be executed by the CPU 1000 during start-up time of the compiler apparatus 10 and programs dependent on the hardware of the compiler apparatus 10. The flexible disk drive 1050 reads the compiler program or data from the flexible disk 1090 and provides it to the input/output chip 1070 via the RAM 1020. The input/output chip 1070 connects the flexible disk 1090 and various input/output devices via, for example, a parallel port, serial port, keyboard port and mouse port.

The compiler program to be provided to the compiler apparatus 10 is supplied by a user as stored in the flexible disk 1090, the CD-ROM 1095, or a recording medium such as an IC card. The compiler program is read out from the recording medium and installed in the compiler apparatus 10 via the input/output chip 1070 to be executed in the compiler apparatus 10.

The compiler program to be installed in the compiler apparatus 10 and executed includes an exception handler detection module, an exception selection module, and an exception handler throw module. Since operations that each module causes the compiler apparatus 10 to perform by operating on it are the same as the operations of corresponding sections within the compiler apparatus 10 described above with FIGS. 1 to 5, description about them is omitted.

The program or modules shown above may be stored in an external storage medium. As the storage medium, optical recording media such as DVD and PD, magneto-optical recording medium such as MD, tape media, and semiconductor memory such as ID card can be used, in addition to the flexible disk 1090 and CD-ROM 1095. Also, a storage device such as hard disk or RAM provided in a server system connected to a dedicated communication network or the Internet may be used as the recording medium so that the compiler program is provided to the compiler apparatus 10 over the network.

As thus described, the compiler apparatus 10 selects a set of exceptions which is shifted to common processing through rethrow of the exceptions by a multiple-catching exception handler and throws a clone exception handler for catching the selected set of exception instead of the multiple-catching exception handler so as to shift it to common processing. Further, the compiler apparatus 10 throws a branch instruction that causes a shift to common processing in the clone exception handler. This allows the compiler apparatus 10 to omit processing that is required upon throw of an exception and to shift processing with a mere branch instruction. In addition, since it can extend a compilation scope, which is an area in a target program which other optimization such as partial redundancy elimination and the like optimizes, the compiler apparatus 10 can increase the efficiency of optimization.

Although the invention has been described with its embodiment, the technical scope of the invention is not limited to the scope described in the embodiment above. Rather, various modification and improvement may be made to the embodiment. It is obvious from the items below that a form with such modification or improvement may also be encompassed within the technical scope of the invention.

According to the embodiment set forth above, the compiler apparatus, compiler program, recording medium, and compiling method can be realized described in the following items.

(Item 1)

A compiler apparatus for optimizing exception handling in a target program as a program to be compiled, comprising:

an exception handler detection section for detecting, from exception handlers that catch exceptions thrown in the target program, a multiple-catching exception handler that catches a plurality of different exceptions and rethrow the caught exceptions;

an exception selection section for selecting a set of exceptions that are to be shifted to common processing through rethrow of the exception by the multiple-catching exception handler from among the plurality of exceptions caught by the detected multiple-catching exception handler; and an exception handler throw section for throwing a clone exception handler that catches the set of exceptions selected by the exception selection section instead of the multiple-catching exception handler and shifting it to common processing.

(Item 2)

The compiler apparatus according to Item 1, wherein the exception handler throw section throws a branch instruction for causing a shift to the common processing in the clone exception handler and causes a shift to the common processing with the branch instruction thrown.

(Item 3)

The compiler apparatus according to Item 1, wherein the exception selection section selects a set of exceptions whose frequency of throw in the multiple-catching exception handler is more than a predetermined reference frequency and which is shifted to the common processing.

(Item 4)

The compiler apparatus according to Item 3, wherein, as a frequency with which exceptions are thrown in the multiple-catching exception handler, the exception selection section detects the number of times that any of the set of exceptions is thrown in the multiple-catching exception handler per the number of execution of the multiple-catching exception handler.

(Item 5)

The compiler apparatus according to Item 1, wherein the common processing includes catching exceptions that are thrown while processing a function that has been called with a function call outside the function call;

the multiple-catching exception handler catches exceptions inside the function call; and the exception selection section selects the set of exceptions further on condition that depth of nesting of function call from the common processing down to the multiple-catching exception handler is more than a predetermined number.

(Item 6)

The compiler apparatus according to Item 1, wherein the exception selection section selects the set of exceptions further on condition that the number of other exception handlers through which processing shifts from the multiple-catching exception handler to the common processing is more than a predetermined number.

(Item 7)

The compiler apparatus according to Item 1, wherein the common processing includes catching exceptions that are thrown while processing a function that has been called with a function call outside the function call;

the multiple-catching exception handler catches exceptions inside the function call; and the exception selection section selects the set of exceptions further based on depth of nesting of function call from the common processing down to the multiple-catching exception handler and the number of other exception handlers through which processing shifts from the multiple-catching exception handler to the common processing.

(Item 8)

The compiler apparatus according to Item 1, wherein the exception handler detection section detects two multiple-catching exception handlers: one multiple-catching exception handler and another multiple-catching exception handler,for catching at least one exception thrown in the one multiple-catching exception handler;

the exception selection section selects a set of exceptions to be shifted to the common processing by rethrowing an exception caught in the another multiple-catching exception handler from among a plurality of exceptions caught by the one multiple-catching exception handler; and the exception handler throw section throws each of two clone exception handlers that correspond to each of the two multiple-catching exception handler and causes each of the corresponding two clone exception handlers to catch the set of exceptions selected by the exception selection section instead of each of the two multiple-catching exception handler.

(Item 9)

A compiler program for causing a computer to function as a compiler apparatus that optimizes exception handling in a target program as a program to be compiled, the compiler program causing the computer to function as:

an exception handler detection section for detecting, from exception handlers that catch exceptions thrown in the target program, a multiple-catching exception handler that catches a plurality of different exceptions and rethrow the caught exceptions;

an exception selection section for selecting a set of exceptions that are to be shifted to common processing through rethrow of the exceptions by the multiple-catching exception handler from among the plurality of exceptions caught by the detected multiple-catching exception handler; and an exception handler throw section for throwing a clone exception handler that catches the set of exceptions selected by the exception selection section instead of the multiple-catching exception handler and shifting it to the common processing.

(Item 10)

The compiler program according to Item 9, wherein the common processing includes catching exceptions that are thrown while processing a function that has been called with a function call outside the function call;

the multiple-catching exception handler catches exceptions inside the function call; and the exception selection section selects the set of exceptions further based on depth of nesting of function call from the common processing down to the multiple-catching exception handler and the number of other exception handlers through which processing shifts from the multiple-catching exception handler to the common processing.

(Item 11)

The compiler program according to Item 9, wherein the exception handler detection section detects two multiple-catching exception handlers: one multiple-catching exception handler and another multiple-catching exception handler for catching at least one exception thrown in the one multiple-catching exception handler;

the exception selection section selects a set of exceptions to be shifted to the common processing by rethrowing an exception caught in the another multiple-catching exception handler from among a plurality of exceptions caught by the one multiple-catching exception handler; and the exception handler throw section throws each of two clone exception handlers that correspond to each of the two multiple-catching exception handler and causes each of the corresponding two clone exception handlers to catch the set of exceptions selected by the exception selection section instead of each of the two multiple-catching exception handler.

(Item 12)

A recording medium having the compiler program according to any of Items 9 to 11 recorded thereon.

(Item 13)

A compiling method for causing a computer to operate as a compiler apparatus that optimizes exception handling in a target program as a program to be compiled, comprising:

an exception handler detection step of detecting, from exception handlers that catch exceptions thrown in the target program, a multiple-catching exception handler that catches a plurality of different exceptions and rethrow the caught exceptions;

an exception selection step of selecting a set of exceptions that are to be shifted to common processing through rethrow of the exceptions by the multiple-catching exception handler from among a plurality of exceptions caught by the detected multiple-catching exception handler; and an exception throw step of throwing a clone exception handler that catches the set of exceptions selected by the exception selection section instead of the multiple-catching exception handler and shifting it to the common processing.

As is obvious from the description above, exception handling can be optimized according to the invention. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system —or other apparatus adapted for carrying out the methods and/or functions described herein —is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which —when loaded in a computer system —is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A compiling method for causing a computer to operate as a compiler apparatus that optimizes exception handling in a target program as a program to be compiled, comprising:
   detecting, from exception handlers that catch exceptions thrown in said target program, a multiple-catching exception handler catching a plurality of different exceptions and rethrowing the caught exceptions;
   selecting a set of exceptions that are to be shifted to common processing through rethrow of the exceptions from among said plurality of exceptions caught;
   throwing a clone exception handler catching the set of exceptions selected by said step of selecting;
   shifting the set of exceptions to said common processing;
   said common processing includes catching exceptions that are thrown while processing a function that has been called with a function call outside said function call;
   said multiple-catching exception handler catches exceptions inside said function call; and
   said selecting selects said set of exceptions further on condition that depth of nesting of function call from said common processing down to said multiple-catching exception handler is more than a predetermined number.

2. A compiling method for causing a computer to operate as a compiler apparatus that optimizes exception handling in a target program as a program to be compiled, comprising:
   detecting, from exception handlers that catch exceptions thrown in said target program, a multiple-catching exception handler catching a plurality of different exceptions and rethrowing the caught exceptions;
   selecting a set of exceptions that are to be shifted to common processing through rethrow of the exceptions from among said plurality of exceptions caught;
   throwing a clone exception handler catching the set of exceptions selected by said step of selecting;
   shifting the set of exceptions to said common processing,
   wherein said selecting selects the set of exceptions further on condition that the number of other exception handlers through which processing shifts from the multiple-catching exception handler to the common processing is more than a predetermined number.

3. A compiling method for causing a computer to operate as a compiler apparatus that optimizes exception handling in a target program as a program to be compiled, comprising:
   detecting, from exception handlers that catch exceptions thrown in said target program, a multiple-catching exception handler catching a plurality of different exceptions and rethrowing the caught exceptions;
   selecting a set of exceptions that are to be shifted to common processing through rethrow of the exceptions from among said plurality of exceptions caught;
   throwing a clone exception handler catching the set of exceptions selected by said step of selecting;
   shifting the set of exceptions to said common processing;
   said common processing includes catching exceptions that are thrown while processing a function that has been called with a function call outside said function call;
   said multiple-catching exception handler catches exceptions inside said function call; and
   said selecting selects said set of exceptions further based on a depth of nesting function call from said common processing down to said multiple catching exception handler and the number of other exception handlers through which processing shifts from said multiple-catching exception handler to said common processing.

* * * * *